2,997,456
STABILIZATION OF POLYMERS OF 1-OLEFINS
Kenneth R. Mills, Bartlesville, Okla., assignor to Phillips Petroleum Company, a corporation of Delaware
No Drawing. Filed May 11, 1959, Ser. No. 812,142
10 Claims. (Cl. 260—45.75)

This invention relates to a method of stabilizing polymers of 1-olefins against molecular degradation under conditions of elevated temperature and/or mechanical working. In another aspect this invention relates to stabilized polymers of 1-olefins which can be fabricated in processes such as injection molding without molecular degradation.

Polymers of 1-olefins, such as for example polypropylene, have numerous valuable properties which permit them to be used in the manufacture of pipe, film, wire coating, or various molded objects such as bottles and the like. These polymers, particularly when prepared under conditions so that they have a high isotactic content, have high tensile strength, are not subject to stress cracking, and display very little creep under load. Isotactic polymers are those having asymmetric carbon atom sequences with the same configuration presenting a characteristic molecular structure. It has been observed, however, that such polymers under conditions of elevated temperature and/or mechanical working, as would be developed in extruders and injection molding machines, either in the presence or absence of air undergo molecular degradation resulting in a deterioration of physical properties. Adequate stabilization of such polymers is of utmost importance in order to protect the polymer during fabrication and use. The molecular breakdown which occurs in these polymers during fabrication is evidenced by a substantial increase in melt index of the polymer.

I have discovered that polymers of 1-olefins having from 3 to 6 carbon atoms per molecule can be stabilized against thermal degradation by incorporating into the polymer a compound having the formula

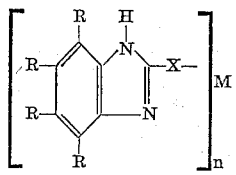

wherein each R is selected from the group consisting of hydrogen, methyl, ethyl, propyl and butyl, the combined R groups containing up to 10 carbon atoms, X is selected from the group consisting of sulfur, selenium and tellurium, M is selected from the group consisting of copper, zinc, cadmium and lead, and $n$ is the valence of M.

It is an object of my invention to provide a method of stabilizing polymers of 1-olefins against thermal degradation. Another object is to provide a stabilized polymer of a 1-olefin which can be processed under conditions of elevated temperature and mechanical working without substantial increase in melt index. Other objects, advantages and features of my invention will be apparent to those skilled in the art from the following discussion.

The polymers to which my invention applies are the normally solid polymers of 1-olefins having from 3 to 6 carbon atoms per molecule such as the polymers of propylene, 1-butene, 1-pentene, and 1-hexene. Of special importance among these is polypropylene, particularly polypropylenes which have a high isotactic content, for example, an isotactic content of about 70 to 90 percent or higher.

A number of methods can be employed to prepare normally solid polymers of 1-olefins which are stabilized by my invention. Such polymers can be prepared by the process described in the U.S. Patent 2,825,721 issued to J. P. Hogan et al. Another method of preparing such polymers involves the use of organometallic catalyst systems such as those systems having two or more catalyst components wherein one compound is an organometal compound, including those in which one or more but not all organo groups are replaced by halogen, a metal hydride, or a metal of Group I, II, or III (Mendeleef Periodic Table); and a second component is a Group IV to VI or VIII metal compound, e.g., a salt or alcoholate. In such systems a third component which can advantageously be included is an organic halide or metal halide. Examples of such catalyst systems include triethylaluminum or triisobutylaluminum with titanium trichloride; tributylaluminum with titanium tetrachloride; titanium tetrachloride with sodium metal; ethyl aluminum sesquichloride with chromyl chloride, ethyl bromide, and magnesium metal; and the like. These and a number of other similar catalyst systems can be used to polymerize 1-olefins to normally solid polymer at temperatures in the range of about 100 to 350° F. in the presence of a hydrocarbon diluent such as cyclohexene, methylcyclohexene, benzene or toluene.

The problem of stabilizing polymers of 1-olefins against molecular breakdown at elevated temperatures is unique. The problem appears to be more acute than when operating with polyethylene. Furthermore, known stabilizers for polyethylene, such as those employed to stabilize the polymer against thermal or oxidative degradation, have been found to be relatively ineffective for the purpose of stabilizing polypropylene against similar degradation during fabrication. It was quite unexpected, therefore, that the compounds employed according to my invention provided the high degree of stabilization demonstrated by the specific examples of this specification.

The stabilizers used in my invention have the general formula given above. Examples of such compounds include zinc mercaptobenzimidazole, zinc mercapto-4-methylbenzimidazole, zinc mercapto-5-ethylbenzimidazole, lead mercapto-4,6-dimethylbenzimidazole, cuprous mercaptobenzimidazole, zinc mercapto-5-tert-butylbenzimidazole, zinc mercapto-4,6-diisopropylbenzimidazole, zinc mercapto-4-ethyl-5-n-butyl-7-isopropylbenzimidazole, zinc mercapto-5-tert-butyl-6,7-diisopropylbenzimidazole, cuprous mercapto-4-methylbenzimidazole, cuprous mercapto-5,6-diethylbenzimidazole, cuprous mercapto-4,7-diisopropylbenzimidazole, cuprous mercapto-4-methyl-5-ethylbenzimidazole, cadmium mercaptobenzimidazole, cadmium mercapto-4-methylbenzimidazole, lead mercaptobenzimidazole, and lead mercapto-5-ethylbenzimidazole. In addition to the mercapto compounds the selenium and tellurium analogs of such compounds can also be used. For example, such compounds are useful as 2-benzimidazole zinc selenide, 2-(4-methylbenzimidazole) cuprous selenide, 2-(5-ethylbenzimidazole) cadmium selenide, 2-(6-isopropylbenzimidazole) lead selenide, 2-benzimidazole zinc telluride, and 2-(4-methylbenzimidazole) cuprous telluride.

The stabilizing additive can be incorporated into the polymers by any suitable means such as by milling the polymer on a roll mill or in a Banbury mixer. Incorporation can also be effected by solution blending or the like. The amount of additive to be used is generally in the range of 0.05 to 5.0 parts by weight per 100 parts by weight of the polymer. Preferably the amount of additive is in the range of 0.1 to 1.0 part per 100 parts of resin.

My invention and the advantages thereof are illustrated in the following examples which are presented as being typical and should not be construed to limit my invention unduly.

EXAMPLE I

Polypropylene having an isotactic content of 73 percent was prepared using a catalyst system comprising titanium trichloride and triisobutyl aluminum. Into this polymer was incorporated 0.5 percent by weight of zinc mercaptobenzimidazole by mixing on a roll mill at 325–350° F. for 10 minutes. Slabs were molded from this material, molding temperature being 350° F. Melt index was determined on a portion of this polymer while the remainder was subjected to heat treatment at 450° F. for 10 minutes, after which melt index was again determined. The melt index of polypropylene milled in the same manner but containing no additive increased from 1.9 to 14.9 under this treatment, an increase of 683 percent while that of the treated polypropylene increased from 1.95 to 2.6, an increase of 33.3 percent over the original.

EXAMPLE II

A series of tests was made in the same manner as those in Example I to compare the effect of zinc mercaptobenzimidazole with that obtained using compounds well known as antioxidants for polyethylene. The results of these tests are shown in Table I. In each instance, the amount of additive was 0.5 percent by weight based on the polymer, addition being made by mixing on a roll mill at 325–350° F. for ten minutes. The polypropylene used was prepared using a catalyst comprising triethylaluminum and titanium trichloride and had an isotactic content of 76 percent. Data from these tests are shown in Table I.

*Table I*

| Additive | Melt Index | | Percent Increase |
| --- | --- | --- | --- |
| | Original | 10 Min. at 450° F. | |
| None | 1.50 | 4.40 | 193 |
| Zinc mercaptobenzimidazole | 1.35 | 1.83 | 43 |
| 4,4'-Butylidine-bis(6-t-butyl-m-cresol) a | 1.97 | 3.59 | 82 |
| 2,6-di-t-butyl-4-methylphenol b | 1.14 | 3.74 | 228 |
| 4,4'-thio-bis(6-t-butyl-m-cresol) c | 1.70 | 4.90 | 188 |
| 2,2'-Benzothiazyl disulfide d | 1.95 | 9.05 | 364 |
| Diphenylamine | 1.50 | 3.45 | 130 | a Santowhite powder.
b Ionol.
c Santonox.
d Altax.

EXAMPLE III

Another series of tests was made in the same manner as in Example II, using polypropylene having an isotactic content of 73 percent prepared with a catalyst comprising triisobutylaluminum and titanium trichloride. Data from these tests are shown in Table II.

*Table II*

| Additive | Melt Index | | Percent Increase |
| --- | --- | --- | --- |
| | Original | 10 Min. at 450° F. | |
| None | 1.9 | 14.9 | 683 |
| Zinc mercaptobenzimidazole | 1.95 | 2.6 | 32 |
| Di-o-cresylolpropane a | 2.2 | 15.9 | 622 |
| Isooctyl phosphite | 1.9 | 15.5 | 715 |
| Zinc oxide | 2.1 | 7.5 | 258 |
| Zinc stearate | 2.2 | 8.4 | 282 | a Bisphenol-A.

The above data demonstrate the surprising results of my invention in the marked superiority of the mercaptobenzimidazole over known stabilizers against similar types of degradation in polyethylene.

Melt index is defined as the grams of polymer extruded in 10 minutes through a 0.0825-inch orifice at 190° C. when subjected to a load of 2160 grams and was determined by ASTM D–1238 modified as follows:

For melt indices in the range 1–10 collect 5 samples at 1-minute intervals and multiply the average weight value by 10. For melt indices in the range 10–30 using a 325-gram weight collect 5 samples at 1-minute intervals, weigh, discard any values which deviate from the average by over 5 percent, multiply the average value by 10, and convert to melt index by the formula:

$$\log MI = 0.921 \log F_2 + 1.039$$

where $MI$ = melt index
$F_2$ = flow rate in grams per 10 minutes at 190° C. with the 325-gram weight As will be evident to those skilled in the art, various modifications of this invention can be made, or followed, in the light of the foregoing disclosure and discussion, without departing from the spirit or scope thereof.

I claim:

1. The method of stabilizing a polymer of a 1-olefin having from 3 to 6 carbon atoms per molecule which comprises mixing with said polymer a stabilizing amount of a compound having the formula

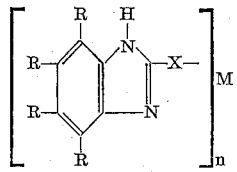

wherein each R is selected from the group consisting of hydrogen, methyl, ethyl, propyl and butyl, the combined R groups containing up to 10 carbon atoms, X is selected from the group consisting of sulfur, selenium and tellurium, M is selected from the group consisting of copper, zinc, cadmium and lead, and $n$ is the valence of M.

2. The method of stabilizing a normally solid polymer of a 1-olefin having from 3 to 6 carbon atoms per molecule against molecular degradation under conditions of elevated temperature and mechanical working which comprises mixing with 100 parts by weight of said polymer from 0.05 to 5.0 parts by weight of a compound having the formula

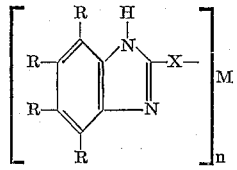

wherein each R is selected from the group consisting of hydrogen, methyl, ethyl, propyl and butyl, the combined R groups containing up to 10 carbon atoms, X is selected from the group consisting of sulfur, selenium and tellurium, M is selected from the group consisting of copper, zinc, cadmium and lead, and $n$ is the valence of M.

3. The method of claim 2 wherein said compound is zinc mercaptobenzimidazole.

4. The method of stabilizing polypropylene which comprises mixing 0.1 to 1.0 part by weight of zinc mercaptobenzimidazole with 100 parts by weight of said polypropylene.

5. A polymer of a 1-olefin having from 3 to 6 carbon atoms per molecule stabilized with a stabilizing amount of a compound having the formula

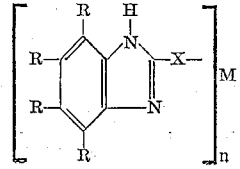

wherein each R is selected from the group consisting of hydrogen, methyl, ethyl, propyl and butyl, the combined R groups containing up to 10 carbon atoms, X is selected from the group consisting of sulfur, selenium and tellurium, M is selected from the group consisting of copper, zinc, cadmium and lead, and $n$ is the valence of M.

6. A polymer of a 1-olefin having from 3 to 6 carbon atoms per molecule stabilized against molecular degradation under conditions of elevated temperature and mechanical working with from 0.05 to 5.0 parts by weight per 100 parts of polymer of zinc mercaptobenzimidazole.

7. Polypropylene stabilized with 0.1 to 1.0 part by weight per 100 parts of polymer of zinc mercaptobenzimidazole.

8. Polypropylene stabilized with 0.1 to 1.0 part by weight per 100 parts of polymer of copper mercaptobenzimidazole.

9. Polypropylene stabilized with 0.1 to 1.0 part by weight per 100 parts of polymer of cadmium mercaptobenzimidazole.

10. Polypropylene stabilized with 0.1 to 1.0 part by weight per 100 parts of polymer of lead mercaptobenzimidazole.

References Cited in the file of this patent

UNITED STATES PATENTS 2,727,879    Vincent _____ Dec. 20, 1955

FOREIGN PATENTS 1,144,496    France _____ Oct. 19, 1957